United States Patent [19]
Bening

[11] 3,731,471
[45] May 8, 1973

[54] SAFE STARTING SYSTEM FOR LAWN AND GARDEN EQUIPMENT

[75] Inventor: Curtis Reinhard Bening, Burnett, Wis.

[73] Assignee: Deere & Company, Moline, Ill.

[22] Filed: Mar. 22, 1972

[21] Appl. No.: 236,909

[52] U.S. Cl. ............. 56/10.5, 56/DIG. 15, 180/53 R
[51] Int. Cl. ............................................. A01d 75/18
[58] Field of Search ............... 56/10.2, 10.5, DIG. 15; 180/53 R, 77; 192/84

[56] References Cited

UNITED STATES PATENTS

| | | | |
|---|---|---|---|
| 3,169,358 | 5/1965 | Ertsgaard et al. | 56/10.5 |
| 3,229,452 | 1/1966 | Hasenbank | 56/10.5 |
| 3,608,285 | 9/1971 | Berk | 56/10.2 |
| 3,626,676 | 12/1971 | Miley et al. | 56/10.5 |

*Primary Examiner*—Antonio F. Guida
*Attorney*—H. Vincent Harsha et al.

[57] ABSTRACT

A riding mower has an internal combustion engine with a magneto type ignition system and a recoil starter. A mower is suspended from the tractor and driven from the engine through a belt drive, which includes a clutch, while the traction wheels are driven through a different drive system, which also includes a clutch. A pair of parallel connected switches are respectively connected to the clutches so that they close when the clutches are engaged, and the switches are connected to the magneto primary coil and a normally closed centrifugal switch, which is disposed between the engine flywheel and the recoil starting mechanism and opens only when the engine reaches a predetermined speed. When the centrifugal switch is closed and either of the clutch switches are closed, the magneto primary is shorted to ground, preventing the starting of the engine when either of the clutches is engaged. When the engine reaches the predetermined speed, the centrifugal switch opens, so that either clutch can be engaged without shorting out the magneto primary coil.

10 Claims, 2 Drawing Figures

Patented May 8, 1973

3,731,471

3,731,471

SAFE STARTING SYSTEM FOR LAWN AND GARDEN EQUIPMENT

BACKGROUND OF THE INVENTION

This invention relates to a system for preventing the starting of an internal combustion engine on a lawn and garden machine, such as a riding mower, a rotary tiller or the like, when one of the drives, such as the main traction drive or the drive to the working implement, is engaged.

With the increasing use of powered lawn and garden equipment, such as riding lawn mowers, lawn and garden tractors, rotary tillers, or snow blowers, there has been increased concern regarding the safety of such machines. Many of such machines utilize an internal combustion engine started with a recoil starter, and generally it is necessary for the operator to leave the controls of the machine to start the engine. If the engine is started with any of the drive clutches engaged, such as the main traction drive or the mower drive in the case of a riding lawn mower, there is an obvious safety hazard.

To overcome this, safe starting systems have been provided, which prevent the starting of the engine when said drives are engaged, two such systems being shown in U. S. Pat. Nos. 3,626,676, issued Dec. 14, 1971 to Miley et al., and 3,608,285, issued Sept. 28, 1971 to Berk, both assigned to the assignee herein.

SUMMARY OF THE INVENTION

According to the present invention, an improved safe starting system is provided for lawn and garden equipment, such as riding mowers or the like. More particularly, there is provided a safe starting system utilizing clutch actuated switches, which short the ignition when one of the drive clutches is engaged unless the engine is rotating above a predetermined speed, a centrifugal switch being disposed in the grounding circuit and rotating with the engine so that it opens when a predetermined speed is reached to interrupt the grounding circuit.

Also according to the invention, the centrifugal switch is mounted on the engine flywheel for rotation therewith between the flywheel and a recoil starter.

An important advantage of the invention resides in the fact that the centrifugal switch is in a protected location, so that it cannot be manually overridden.

DESCRIPTION OF THE PREFERRED EMBODIMENT

Figure 1:
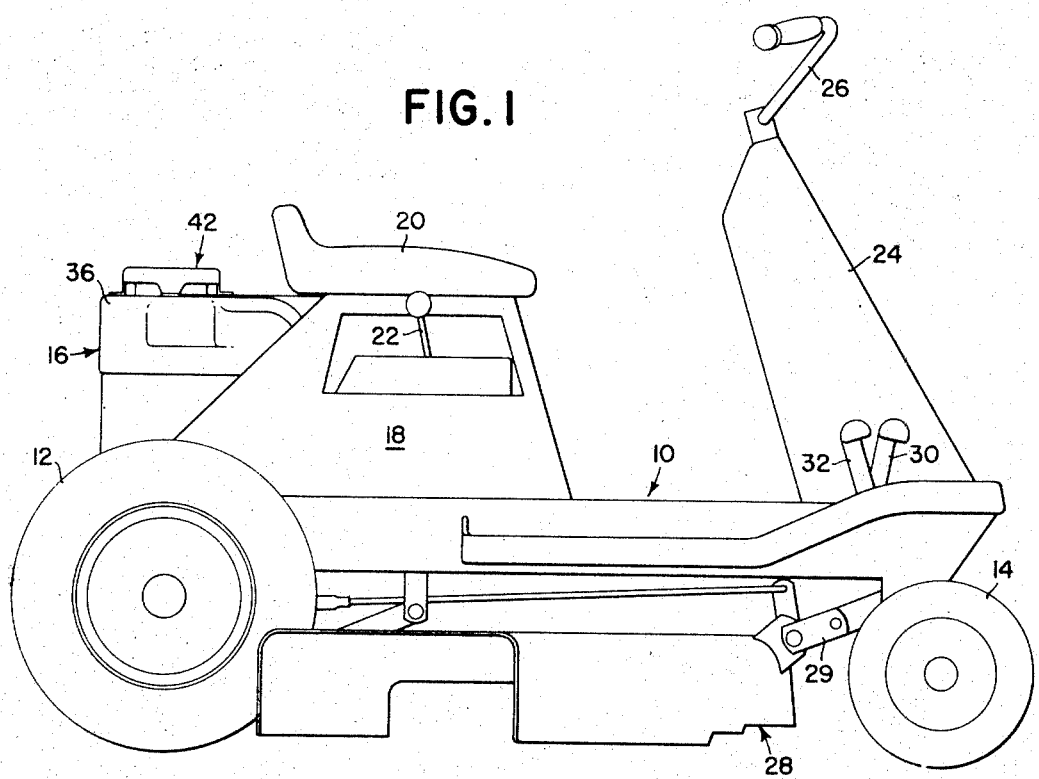
FIG. 1 is a side elevation view of a riding mower in which the invention is embodied.

The invention is embodied in a riding mower having a main frame 10 mounted on a pair of rear drive wheels 12 and steerable front wheels 14. An internal combustion engine 16 is mounted on the main frame 10 above the rear drive wheels 12 in a hood-like engine enclosure 18 partly covering the engine 16 and extending forwardly therefrom. An operator's seat 20 is mounted on top of the enclosure 18, and a transmission control lever 22 projects from the right side of the enclosure for manipulation by a seated operator. An inclined steering pedestal 24 extends upwardly and rearwardly from the front end of the main frame and supports a steering handle 26 which controls the position of the front wheels 14.

A mower unit, indicated in its entirety by the numeral 28, is suspended from the main frame between the front and rear drive wheels 12 and 14 by means of a suspension linkage 29. The mower unit 28 is of the well-known rotary type, and includes rotating horizontal blades, which are driven from the engine by a conventional belt drive (not shown). As is also well known, the drive to the mower unit is selectively engageable or disengageable by shifting a pulley, which controls the tension of the drive belt. The pulley is moved to tension the drive belt by depressing a clutch pedal 30 pivotally mounted on the main frame on the right side of the steering pedestal 24, the clutch being released or disengaged by depressing a clutch release pedal mounted adjacent to the clutch pedal 30. The above described clutching mechanism for the mower drive is described in detail in said U. S. Pat. Nos. 3,608,285 and 3,626,676.

As is also well known, a declutchable belt drive is utilized to transmit the driving torque from the engine to the propulsion transmission (not shown). The propulsion drive is disengaged by depressing a clutch pedal 34, which is shown only in FIG. 2, since it is mounted on the left side of the pedestal 24 and not visible in FIG. 1. The depression of the pedal 34 initially disengages the clutch, and further depression of the pedal actuates a braking mechanism, as also described in U. S. Pat. Nos. 3,608,285 and 3,626,676.

The engine 16 includes an engine housing 36 and has a vertical output shaft 37. A flywheel 38 is secured to the upper end of the output shaft by means of a nut 40. A conventional recoil starter 42 is mounted on top of the engine housing 36 above the flywheel 38 and includes a housing 44 secured to the top of the engine housing by means of bolts 46 extending through both housings and secured therein by nuts 48. Insulated washers 50 are provided between the bolt heads and the starter housing 44 and also between the starter housing 44 and the engine housing 36. The starter 42 also includes a starter rope 52 wound on a pulley 54 secured to a shaft 56, which is rotatable relative to the starter housing 44 while electrically connected thereto. The rope extends tangentially through the housing and has a handle 57 on its exterior end.

A hub 58 is attached to the starter shaft 56 and is rotatable within a cup-like element 60 clamped to the flywheel 38 by the nut 40. As is well known, pulling on the rope causes a driving lug or dog (not shown) on the hub 58 to engage an abutment (also not shown) on the cup to form a one-way driving connection between the hub and the flywheel which causes the engine to turn when the rope is pulled.

Figure 2:
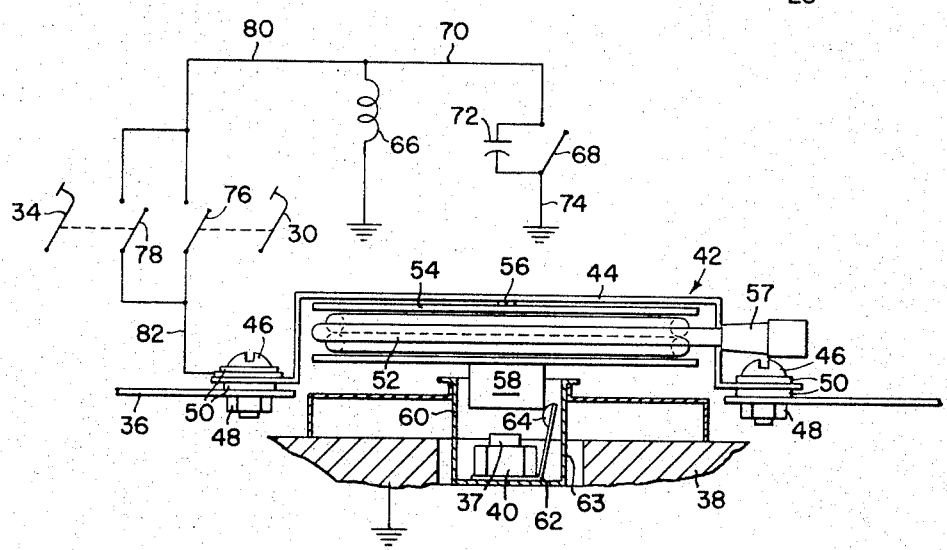
FIG. 2 is a schematic view of the safe starting system, including a sectional view of the engine recoil starting mechanism and a portion of the flywheel.

A centrifugal switch element 62 is clamped between the cup 60 and the nut 40 and includes an upwardly extending spring-like arm 63 having a hemispherical contact 64 at its upper end. When the flywheel is not rotating, the arm is in its closed position, as illustrated in FIG. 2, wherein it maintains the contact 64 against the hub 58. However, when the speed of the flywheel and consequently of the switch element 62 reaches a predetermined value, the centrifugal force acting on the arm 63 causes the upper end of the arm to swing outwardly so that the contact 64 disengages the hub 58. Of course, the speed at which the arm breaks contact with the hub depends on the stiffness of the spring, and in the preferred embodiment the spring stiffness is selected so that contact is maintained until approximately 1,000 RPM. Thus, whenever the engine is rotating at less than 1,000 RPM, there is an electrical connection between the starter housing 44 and the flywheel 38, which, of course, is part of the engine and functions as a ground.

The engine 16 utilizes a magneto type ignition system, which includes a primary coil 66 having one end connected to ground, in this case the engine, and its opposite end connected to breaker points 68 by a conductor 70. A condenser 72 is mounted in parallel with the breaker points 68 and the breaker points are grounded to the engine by a lead 74, all of the above being conventional magneto ignition system construction. Since the system is conventional, the secondary coil and spark plug are not illustrated.

A mower clutch switch 76 is connected to the mower clutch pedal 30, so that it opens when the clutch pedal is released and the mower drive is disengaged. A drive clutch switch 78 is connected in parallel with the mower clutch 76 and is shiftable into its open condition when the drive clutch pedal 34 is depressed to disengage the main drive. The relationship of the switches 76 and 78 to the mower drive and the main traction drive is also described in greater detail in U. S. Pat. Nos. 3,608,285 and 3,626,676. The parallel connected switches 76 and 78 are connected to the ungrounded side of the primary coil 66 by means of a conductor 80, while the opposite side of the switches is connected to the starter housing 44 by a conductor 82, which is clamped to the housing 44 by means of one of the bolts 46.

In operation, when either the mower clutch switch 76 or the drive clutch switch 78 is closed as a result of the mower drive being engaged or the main drive being engaged, the primary coil 66 will be shorted to ground through the conductor 88, the closed switch, the conductor 82, the starter housing 44, the shaft 56, the hub 58, and the centrifugal switch element 62, provided, of course, that the centrifugal switch is closed, as a result of the engine being stopped or rotating at less than 1,000 RPM. Thus, it would be impossible to start the engine with either the mower drive or the main traction drive engaged. Obviously, when both of said drives are disengaged, the engine can then be started, and after the engine reaches a predetermined speed, 1,000 RPM in the illustrated embodiment, the switch element 62 swings to its open condition to break the grounding circuit, so that closing of either or both of the switches 76 or 78 will not short out the primary coil 66.

Of course, the same or similar system can be utilized on other types of equipment. For example, in a machine such as a rotary tiller, a grounding switch could be made responsive to the clutch which engages the drive to the rotating tiller element. Since such a machine does not include a traction drive, only a single clutch-actuated switch would be necessary. Similarly, the system could be utilized on a snow blower so that the engine could not be started when the drive to the snow throwing element is engaged. Obviously, the system could also be utilized in a lawn and garden tractor having a traction drive and a drive for any attached implement, such as a mower or rotary tiller.

I claim:

1. In a lawn and garden machine having a mobile main frame, an internal combustion engine having an ignition system, a working tool and means for drivingly connecting the engine to the working tool and including a clutch means selectively engageable and disengageable to respectively establish or disestablish the driving connection, the improvement comprising: a first switch means operatively connected to and responsive to the condition of the clutch means so that it is open when the clutch means is disengaged and closed when the clutch means is engaged; a normally closed centrifugal switch means operatively mounted on the engine and shiftable into an open condition when the engine speed exceeds a predetermined value; and electrical conductor means operatively connecting the first switch means and centrifugal switch means in series between the ignition and ground to short the ignition system when both switch means are closed and thereby prevent the engine from being started when the clutch means is engaged.

2. The invention defined in claim 1 wherein the ignition system is of the magneto type and includes a primary coil, the conductor means being connected to the primary coil to short the primary coil to ground when both switch means are closed.

3. The invention defined in claim 1 wherein the machine includes drive wheel means and means for drivingly connecting the engine to the drive wheel means and including a second clutch means selectively engageable and disengageable to respectively establish and disestablish the driving connection, and including a second switch means connected in parallel with the first switch means and responsive to the condition of the second clutch means so that it respectively opens and closes in response to disengagement and engagement of the clutch means, to short the ignition system when either clutch means is engaged and the engine is rotated below said predetermined speed.

4. The invention defined in claim 3 wherein the working tool is a mower unit and the first clutch means is disposed in the mower drive to prevent the engine from being started when the mower drive is engaged.

5. The invention defined in claim 1 wherein the engine includes a recoil starter and a flywheel and the centrifugal switch means includes a shiftable arm connected to and rotatable with the flywheel and biased toward engagement with the recoil starter, the arm being swingable out of engagement with the recoil starter in response to centrifugal force when the flywheel speed exceeds said predetermined value to open said switch means.

6. In a machine having a mobile main frame, an internal combustion engine mounted on the frame and having a magneto ignition system with a primary coil, a driven element, and means drivingly connecting the engine to the driven element and including a clutch means selectively engageable and disengageable to respectively establish or disestablish the driving connection, the improvement comprising: a first switch means mounted on the frame and operatively connected to the clutch means to respectively open and close in response to disengagement and engagement of the clutch means; a normally closed centrifugal switch means operatively mounted on a rotating engine element for shifting to an open condition in response to centrifugal force when the rotating element reaches a predetermined speed; and a grounded electrical conductor means operatively connecting the centrifugal switch means and the first switch means in series to the magneto primary coil so that the primary coil is shorted to ground when the first switch means and the centrifugal switch means are closed.

7. The invention defined in claim 6 wherein the engine includes a flywheel, and the centrifugal switch means is mounted on the flywheel.

8. The invention defined in claim 6 wherein the engine includes a recoil starter and a flywheel and the centrifugal switch means includes a shiftable arm connected to and rotatable with the flywheel and biased toward engagement with the recoil starter, the arm being swingable out of engagement with the recoil starter in response to centrifugal force when the flywheel speed exceeds said predetermined value to open said switch means.

9. The invention defined in claim 6 wherein the driven element comprises a mower unit and the first clutch means is disposed in the mower unit drive to prevent the engine from starting when the mower drive is engaged.

10. The invention defined in claim 9 wherein the machine includes drive wheel means and means for drivingly connecting the engine to the drive wheel means and including a second clutch means selectively engageable and disengageable to respectively establish and disestablish the driving connection, and including a second switch means connected in parallel with the first switch means and responsive to the condition of the second clutch means so that it respectively opens and closes in response to disengagement and engagement of the clutch means, to short the ignition system when either clutch meanS is engaged and the engine is rotated below said predetermined speed.

* * * * *